US011320034B2

(12) United States Patent
Kiyosawa et al.

(10) Patent No.: US 11,320,034 B2
(45) Date of Patent: May 3, 2022

(54) STRAIN WAVE GEARING HAVING UNIT STRUCTURE

(71) Applicant: HARMONIC DRIVE SYSTEMS INC., Tokyo (JP)

(72) Inventors: Yoshihide Kiyosawa, Azumino (JP); Norio Shirokoshi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 192 days.

(21) Appl. No.: 16/754,030

(22) PCT Filed: Oct. 31, 2017

(86) PCT No.: PCT/JP2017/039444
§ 371 (c)(1),
(2) Date: Apr. 6, 2020

(87) PCT Pub. No.: WO2019/087316
PCT Pub. Date: May 9, 2019

(65) Prior Publication Data
US 2020/0240500 A1    Jul. 30, 2020

(51) Int. Cl.
*F16H 49/00* (2006.01)
*F16C 17/04* (2006.01)
*F16H 57/021* (2012.01)

(52) U.S. Cl.
CPC .......... *F16H 49/001* (2013.01); *F16C 17/04* (2013.01); *F16H 57/021* (2013.01)

(58) Field of Classification Search
CPC ...... F16H 49/001; F16H 57/021; F16H 55/06; F16H 55/08; F16C 17/04; F16C 2361/61; F16C 17/10
See application file for complete search history.

(56) References Cited

FOREIGN PATENT DOCUMENTS

| DE | 102014112689 A1 * | 8/2015 | ........... F16H 49/001 |
|---|---|---|---|
| JP | H01206137 A | 8/1989 | |
| JP | 2005291237 A | 10/2005 | |
| JP | 2005308131 A | 11/2005 | |

(Continued)

OTHER PUBLICATIONS

International Search Report (PCT/ISA/210) dated Dec. 12, 2017, by the Japan Patent Office as the International Searching Authority for International Application No. PCT/JP2017/039444.

(Continued)

*Primary Examiner* — Victor L MacArthur
(74) *Attorney, Agent, or Firm* — Buchanan Ingersoll & Rooney PC

(57) ABSTRACT

A cup-type strain wave gearing having a unit structure and having: a stationary-side part including a unit housing and an internally toothed gear; a driving-side part including an output member and an externally toothed gear; and a sliding bearing supporting the stationary-side part and the driving-side part in the radial direction and the thrust direction in a state in which relative rotation is possible. The sliding bearing has a cylindrical bushing accommodated in a radial gap, and annular bushings accommodated respectively in thrust gaps. Thus, it is possible to provide an advantageous strain wave gearing having a unit structure that is more lightweight and compact than when a rolling bearing is used.

15 Claims, 3 Drawing Sheets

(56) References Cited

FOREIGN PATENT DOCUMENTS

| JP | 2009061836 A | 3/2009 |
|---|---|---|
| JP | 2015224684 A | 12/2015 |

OTHER PUBLICATIONS

Written Opinion (PCT/ISA/237) dated Dec. 12, 2017, by the Japan Patent Office as the International Searching Authority for International Application No. PCT/JP2017/039444.

* cited by examiner

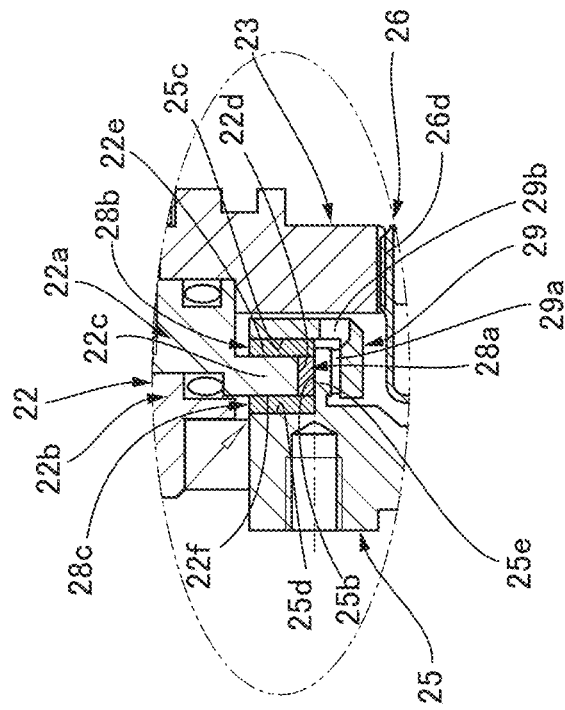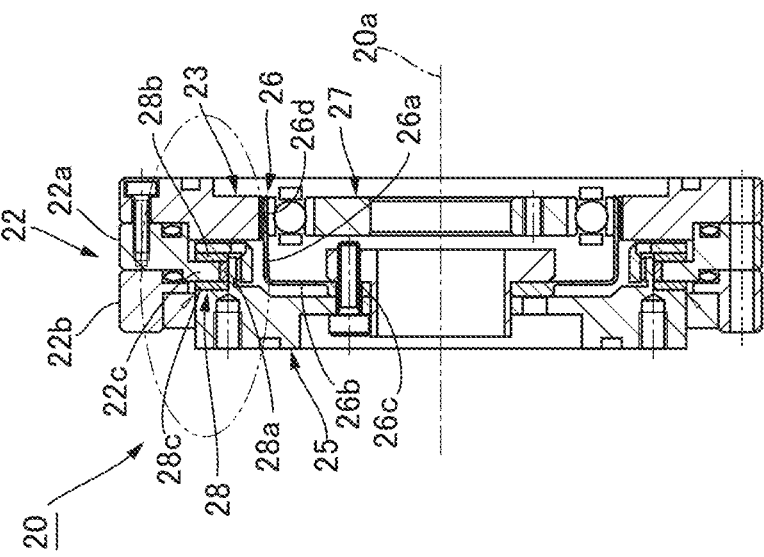

STRAIN WAVE GEARING HAVING UNIT STRUCTURE

TECHNICAL FIELD

The present invention relates to a strain wave gearing having a unit structure provided with a bearing for supporting a rigid internally toothed gear and a flexible externally toothed gear in a relatively rotatable state.

BACKGROUND ART

A strain wave gearing having a unit structure is provided with: a unit housing in which an internally toothed gear, an externally toothed gear and a wave generator are incorporated; a bearing for supporting the internally toothed gear and the externally toothed gear in a relatively rotatable state; and an output member from which a reduced-speed ration is outputted. As the bearing in a strain wave gearing having a unit structure, a crossed-roller bearing, a four-point contact ball bearing or other rolling bearing is used as described in Patent documents 1 and 2.

PRIOR ART DOCUMENTS

Patent Documents

PATENT DOCUMENT 1: JP 2005-291237 A
PATENT DOCUMENT 2: JP 2005-308131 A

SUMMARY OF THE INVENTION

Problems to be Solved by the Invention

In a strain wave gearing having a unit structure, an outer ring of a rolling bearing is, for example, integrally formed with a unit housing, so that the unit structure is made compact and the number of component parts thereof is reduced.

An object of the present invention is to provide a strain wave gearing having a unit structure, which is advantageous for weight reduction and compactness as compared with a conventional one.

Means of Solving the Problems

A strain wave gearing having a unit structure according to the present invention has a bearing for supporting a rigid internally toothed gear and a flexible externally toothed gear in a relatively rotatable state, in which a sliding bearing is employed as the bearing in place of a rolling bearing.

Specifically, a strain wave gearing having a unit structure of the present invention includes:

a rigid internally toothed gear;

a flexible externally toothed gear capable of meshing with the internally toothed gear;

a wave generator for making the externally toothed gear to flex into a non-circular shape and to partially mesh with the internally toothed gear;

a cylindrical unit housing to which a first gear is mounted, the first gear being one of the internally toothed gear and the externally toothed gear;

an output member to which a second gear is mounted, the second gear being the other of the internally toothed gear and the externally toothed gear; and a sliding bearing for supporting a first part and a second part in a radial direction and in a thrust direction so that the first and second parts can relatively rotate, the first part including the unit housing and the first gear, the second part including the second gear and the output member.

The unit housing and the first gear are set to be a stationary-side part secured so as not to rotate. The second gear and the output member are set to be a driving-side part from which a reduced-speed rotation is outputted. In this case, one of the stationary-side part and the driving-side part is formed with an annular convex part having a rectangular cross-section and protruding in a radial direction. The other of the stationary-side part and the driving-side part is formed with an annular concave part having a rectangular cross-section in which the annular convex part is accommodated from outside or inside in the radial direction. The annular convex part and the annular concave part are set to face with each other in the radial direction across a prescribed radial gap. The annular convex part and the annular concave part are also set to face with each other on both sides of the annular convex part in a device axial direction, respectively, across prescribed thrust gaps. The sliding bearing is constituted by: an outer-ring portion defined by one of the annular convex part and the annular concave part; an inner-ring portion defined by the other of the annular convex part and the annular concave part; a cylindrical bush accommodated in the radial gap; and annular bushes accommodated in the thrust gaps, respectively.

Using the sliding bearing makes it possible for a strain wave gearing having a unit structure to be made small and compact in comparison with a case in which a rolling bearing is used.

Here, the unit housing, the internally toothed gear and the output member can be a component part made of either one of steel, light alloy, ceramic and plastic, respectively. These component parts are manufactured from such a material as lighter than the iron-based material, for example, a light alloy such as an aluminum alloy, a magnesium alloy et al, or plastic, whereby the weight of the device can be reduced.

The surface portions, which define the outer-ring portion and the inner-ring portion of the annular convex part and the annular concave part, are made to be a plating treatment surface subjected to a hard plating treatment, a solid lubricant plating treatment or other plating treatment. This can make sure to obtain required characteristics such as surface hardness, wear resistance/friction and lubricity.

BRIEF DESCRIPTION OF THE DRAWINGS

FIG. 3(*a*) is a cross-sectional view illustrating a cup-type strain wave gearing according to a third embodiment of the present invention, and FIG. 3(B) is an enlarged partial view thereof.

MODE FOR CARRYING OUT THE INVENTION

Embodiments of a strain wave gearing having a unit structure to which the present invention is applied will be described below with reference to the drawings. In the following embodiments, a flexible externally toothed gear is made to flex into an elliptical shape by a wave generator and to mesh with a rigid internally toothed gear simultaneously at two positions in a circumferential direction. The present invention is also applicable in a similar manner to a strain wave gearing having a structure in which an externally toothed gear is flexed into a three-lobe shape so as to mesh with an internally toothed gear at three positions.

First Embodiment

Figure 1B:
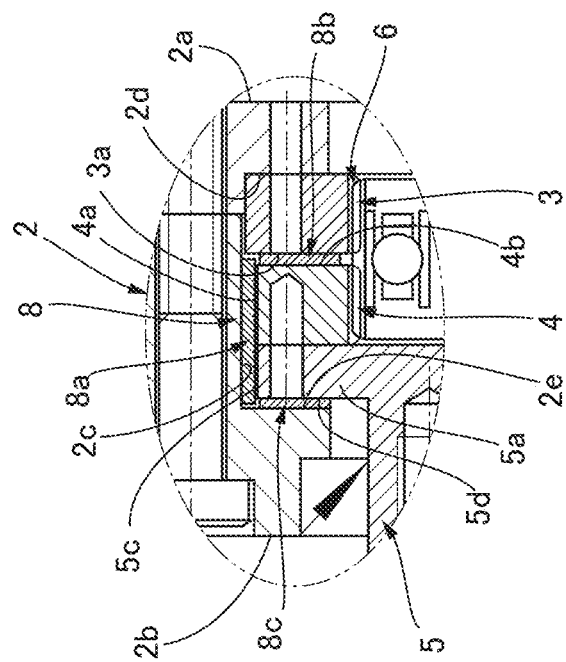
FIG. 1(*a*) is a cross-sectional view illustrating a flat-type strain wave gearing according to a first embodiment of the present invention, and FIG. 1(*b*) is an enlarged partial view thereof.
Figure 1A:
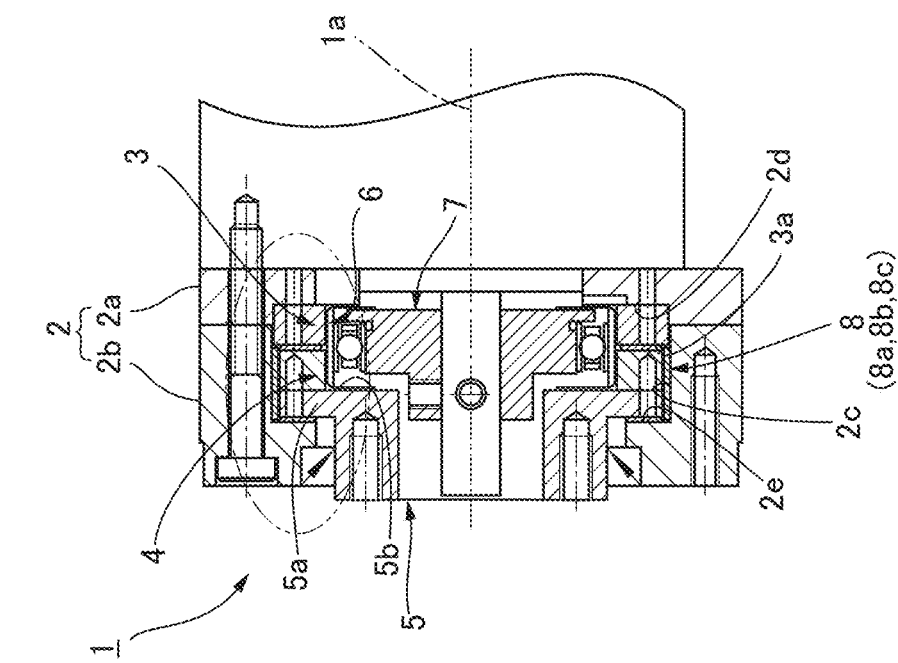

FIG. 1(a) is a cross-sectional view illustrating a strain wave gearing having a unit structure according to a first embodiment, and FIG. 1(b) is an enlarged partial view thereof. The first embodiment is a case in which the present invention is applied to a flat-type strain wave gearing. A flat-type strain wave gearing having a unit structure 1 (hereinafter simply refer to a "strain wave gearing 1") is provided with a cylindrical unit housing 2. The unit housing 2 is constituted by an annular first housing 2a and an annular second housing 2b, in this embodiment.

A rigid first internally toothed gear 3 having an annular shape and a rigid second internally toothed gear 4 having an annular shape are disposed inside the unit housing 2. The first and second internally toothed gears 3 and 4 are coaxially disposed in parallel in a direction of a device axial line 1a. The unit housing 2 is formed with a circular inner peripheral surface 2c. An annular end face 2d and an annular end face 2e extending inward in the radial direction are formed at both ends of the circular inner peripheral surface 2c. The first internally toothed gear 3 is a stationary-side gear (a first gear), and is coaxially attached to the unit housing 2 in a state of being in contact with and positioned by the circular inner peripheral surface 2c and the annular end face 2d.

A discoid output member 5 is coaxially disposed inside the unit housing 2. The output member 5 is disposed on a side of the second internally toothed gear 4, the side being opposite to the first internally toothed gear 3 when viewed along the direction of the device axial line 1a. The output shaft 5 is formed with a center through hole, and an annular flange 5a is formed on the end part of the output shaft on the side of the second internally toothed gear 4. The annular flange 5a has an end face 5b to which the second internally toothed gear 4 is coaxially attached.

A flexible externally toothed gear 6 having a cylindrical shape is coaxially disposed inside the first and second internally toothed gears 3 and 4. A wave generator 7 having an elliptical contour is coaxially disposed inside the externally toothed gear 6. The wave generator 7 makes the externally toothed gear 6 to flex into an elliptical shape and to mesh with the first and second internally toothed gears 3 and 4, respectively, at two positions in a circumferential direction (at both end positions of the major axis of the elliptical shape). The number of teeth of the first internally toothed gear 3 is different from that of the externally toothed gear 6, so that the externally toothed gear 6 rotates relative to the first internally toothed gear 3 which is the stationary-side gear when the wave generator 7 is rotated. The externally toothed gear 6 has the same number of teeth as that of the second internally toothed gear 4 and is a driving-side gear (a second gear) which rotates integrally with the second internally toothed gear 4. The rotation of the externally toothed gear 6 is outputted, via the second internally toothed gear 4, from the output member 5.

Here, a sliding bearing 8 is disposed between the stationary-side part and the driving-side part, the stationary-side part being composed of the unit housing 2 and the first internally toothed gear 3, the driving-side part being composed of the second internally toothed gear 4 and the output member 5. The driving-side part is supported in a radial direction and a thrust direction by the sliding bearing 8 in a state in which the driving-side part is relatively rotatable with respect to the stationary-side part.

Referring mainly to FIG. 1(b), there is formed an annular concave part having a rectangular cross-section and opening inward in the radial direction on the side of the stationary-side part, the annular concave part being formed by a circular inner peripheral surface 2c and an annular end face 2e of the unit housing 2 and an annular end face 3a of the first internally toothed gear 3. An annular convex part is formed by an annular flange 5a of the output member 5 and the second internally toothed gear 4 on the side of the driving-side part. The annular convex part is accommodated in the annular concave part from the inner side in the radial direction, so that a constant radial gap and constant thrust gaps are formed therebetween.

In the present embodiment, the annular flange 5a of the output member 5 of the driving-side part has a circular outer peripheral surface 5c and the second internally toothed gear 4 of the driving-side part has an circular outer peripheral surface 4a, and the circular outer peripheral surfaces 5c and 4a face the circular inner peripheral surface 2c of the unit housing 2 of the stationary-side part via a constant radial gap in the radial direction. In addition, the second internally toothed gear 4, which is the driving-side part, has an annular end face 4b that faces the annular end face 3a of the first internally toothed gear 3, which is the stationary-side part, along the device axial direction via a constant thrust gap. Similarly, the annular flange 5a of the output member 5, which is the driving-side part, has an end face 5d that faces the annular end face 2e of the unit housing, which is the stationary-side part, along the device axial direction via a constant thrust gap.

A cylindrical bush 8a is accommodated in the radial gap as a sliding element constituting the radial bearing portion of the sliding bearing 8. Annular bushes 8b and 8c are accommodated in the thrust gaps, respectively, as a sliding member constituting the thrust bearing portion of the sliding bearing 8.

The cylindrical bush 8a is fixed to the circular inner peripheral surface 2c of the unit housing 2 which is the stationary-side part so as not to slide along the inner peripheral surface 2c, but it can slide in the circumferential direction along the circular outer peripheral surface 5c of the annular flange 5a and along the circular outer peripheral surface 4a of the second internally toothed gear 4, the second internally toothed gear and the annular flange being the driving-side part. The cylindrical bush 8b is fixed to the annular end face 3a of the first internally toothed gear 3 which is the stationary-side part so as not to slide along the annular end face, but it can slide in the circumferential direction along the annular end face 4b of the second internally toothed gear 4 which is the driving-side part. Similarly, the annular bush 8c is fixed to the annular end face 2e of the unit housing 2 which is the stationary-side part, but it can slide in the circumferential direction along the end face 5d of the annular flange 5a which is the driving-side part.

As described above, the sliding bearing 8 is disposed in the strain wave gearing 1 as the bearing to support the stationary-side part and the driving-side part in a relatively rotatable state instead of a rolling bearing such as a crossed-roller bearing, a four-point contact ball bearing or the like. The sliding bearing 8 is constituted by the outer-ring portion defined by the above-mentioned annular concave part, the inner-ring portion defined by the above-mentioned annular convex part, the cylindrical bush 8*a* accommodated in the radial gap, and the annular bushes 8*b* and 8*c* respectively accommodated in the thrust gaps. By using the sliding bearing 8, it is possible to reduce the size of the device and make the device compact easily, and it is also advantageous for reducing the weight of the device.

Here, the unit housing 2, the first internally toothed gear 3, the second internally toothed gear 4 and the output member 5 can be a component part made of a material selected from steel, light alloy, ceramic, plastic and the like. When these component parts are manufactured from a material such as a light alloy or plastic, the weight of the device can be reduced. In addition, there are cases in which the inner peripheral surface of the above annular concave part defining the outer-ring portion and the outer peripheral surface of the above annular convex part defining the inner-ring portion of the sliding bearing 8 have surface hardness, wear resistance/friction, lubricity or other characteristics that may not satisfy required ones. In such cases, hard plating treatment, solid lubricant dispersion plating treatment or other surface treatment may be applied to the surfaces (inner peripheral surface and outer peripheral surface) of these component parts. Desired surface hardness, wear resistance/friction and/or lubricity can be obtained.

Second Embodiment

Figure 2A:
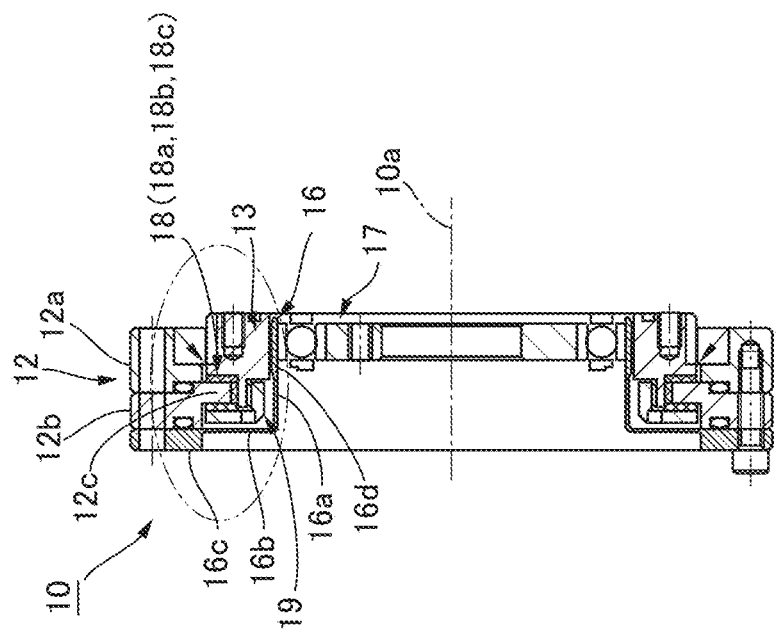
FIG. 2(*a*) is a cross-sectional view illustrating a top-hat type strain wave gearing according to a second embodiment of the present invention, and FIG. 2(*b*) is an enlarged partial view thereof.
Figure 2B:
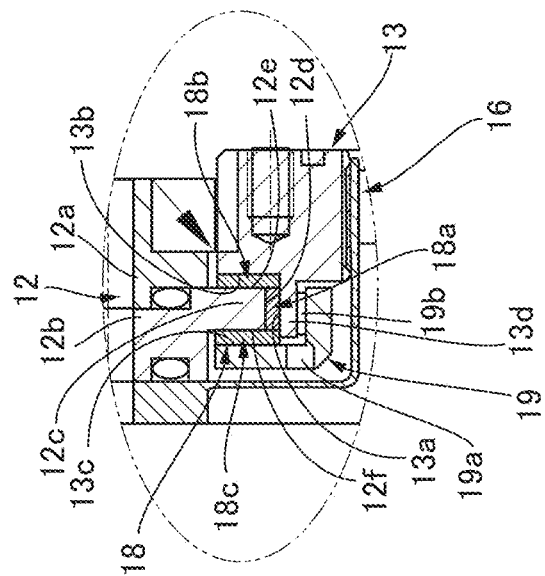

FIG. 2(*a*) is a cross-sectional view illustrating a strain wave gearing having a unit structure according to a second embodiment, and FIG. 2(*b*) is an enlarged partial view thereof. The second embodiment is a case in which the present invention is applied to a top-hat type strain wave gearing. A top-hat type strain wave gearing having a unit structure 10 (hereinafter simply refer to as a "strain wave gearing 10") has a cylindrical unit housing 12 that has a structure in which an annular first housing 12*a* and an annular second housing 12*b* are coaxially fixed with each other in a direction of a device axial line 10*a*. A rigid internally toothed gear 13 having an annular shape is coaxially disposed inside the unit housing 12. A flexible externally toothed gear 16 capable of meshing with the internally toothed gear 13 is coaxially disposed inside the internally toothed gear 13. A wave generator 17 having an elliptical contour is disposed inside the externally toothed gear 16. The wave generator 17 makes the externally toothed gear 16 to flex into an elliptical shape and to mesh with the internally toothed gear 13 at two positions in a circumferential direction.

In this embodiment, the externally toothed gear 16 is a stationary-side gear (a first gear) attached coaxially to the unit housing 12. The internally toothed gear 13 is a driving-side gear (a second gear) functioning as an output member (or having an output member integrally formed thereon) that outputs a reduced-speed rotation. A sliding bearing 18 is disposed between a stationary-side part and a driving-side part, in which the unit housing 12 and the externally toothed gear 16 are the stationary-side part and the internally toothed gear 13 is the driving-side part. The driving-side part is supported on the stationary-side part by means of the sliding bearing 18 in a radial direction and a thrust direction.

The externally toothed gear 16 is formed to have a top-hat shape and is provided with a cylindrical body 16*a*, a diaphragm 16*b* extending outward in the radial direction from one end of the cylindrical body 16*a*, an annular rigid boss 16*c* formed to be continued from the outer peripheral edge of the diaphragm 16*b*, and external teeth 16*d* formed on the outer peripheral surface portion of the cylindrical body 16*a*, the outer peripheral surface portion being located on the side of the other end of the cylindrical body. The boss 16*c* is disposed adjacent to the second housing 12*b* of the unit housing 12 in the direction of the device axial line 10*a* and is coaxially attached to the end face of the second housing 12*b*. The internally toothed gear 13 is coaxially disposed between the external teeth 16*d* of the cylindrical body 16*a* and the first housing 12*a*.

Explanation will be made to the sliding bearing 18 referring mainly to FIG. 2(*b*). The second housing 12*b* of the unit housing 12, which is the stationary-side part, has a circular inner peripheral surface formed with an annular convex part 12*c* that has a rectangular cross-section and protrudes inward in the radial direction. An annular concave part having a rectangular cross-section is formed on the side of the internally toothed gear 13 which is the driving-side part. The annular concave part in this embodiment is formed by a circular outer peripheral surface 13*a* and annular end faces 13*b* and 13*c* on the side of the internally toothed gear 13. The annular convex part 12*c* is accommodated in the annular concave part from outside in the radial direction in a state in which a constant radial gap and constant thrust gaps are formed.

In this embodiment, the annular convex part 12*c* of the second housing 12*b*, which is the stationary-side part, has a circular inner peripheral surface 12*d*, and the circular outer peripheral surface 13*a* of the internally toothed gear 13 which is the driving-side part faces the circular inner peripheral surface 12*d* across a constant radial gap in the radial direction. The annular end face 13*b* of the internally toothed gear 13 faces the annular end face 12*e* of the annular convex part 12*c* across a constant thrust gap in the direction of the device axial line 10*a*. Similarly, the annular end face 13*c* of the internally toothed gear 13 faces the other annular end face 12*f* of the annular convex part 12*c* across a constant thrust gap in the direction of the device axial line 10*a*. A cylindrical bush 18*a* as a sliding member constituting a radial bearing portion of the sliding bearing 18 is accommodated in the radial gap. Annular bushes 18*b* and 18*c* as a sliding member constituting a thrust bearing portion of the sliding bearing 18 are accommodated in the thrust gaps, respectively.

The annular concave part on the side of the internally toothed gear 13 in this embodiment is configured as follows. The annular end face 13*b* of the internally toothed gear 13 is formed with a cylindrical part 13*d* having a rectangular cross-section. The cylindrical part 13*d* protrudes toward the side of the diaphragm 16*b* along the direction of the device axial line 10*a*. A female screw is formed on the circular inner peripheral surface of the cylindrical part 13*d*. An annular flange 19, which has an L-shaped cross-section and a male screw formed thereon, is screwed into and fixed to the cylindrical part 13*d* along the direction of the device axial line 10*a*. The circular outer peripheral surface 13*a* of the annular concave part is formed on the cylindrical part 13*d*, and the annular end face 13*c* of the annular concave part is formed on the annular flange 19.

Here, the annular flange 19 is formed with through holes 19*a* that pass through in the direction of the device axial line 10*a* at a predetermined interval along the circumferential direction. The through holes 19*a* are used as a tool engaging hole when screwing the annular flange 19. The through holes are also used as an adhesive hole for bonding and fixing the threaded portion 19*b* between the annular flange 19 and the cylindrical part 13d. The thrust gap can be adjusted by increasing or decreasing the screwing amount of the annular flange 19.

The strain wave gearing 10 employs the sliding bearing 18 as a bearing for supporting the stationary-side part and the driving-side part in a relatively rotatable state. The sliding bearing 18 is constituted by an outer-ring portion defined by the above annular convex part, an inner-ring portion defined by the above annular concave part, the cylindrical bush 18a accommodated in the radial gap, and the annular bushes 18b and 18c respectively accommodated in the thrust gaps. By using the sliding bearing 18, the device can be easily reduced in size and made compact, and it is advantageous to reduce the weight of the device.

Here, the unit housing 12 and the internally toothed gear 13 can be made from a material selected from steel, light alloy, ceramic and plastic, respectively. When these components are made from a material such as a light alloy or a plastic, the device can be further reduced in weight. Further, hard plating, solid lubricant dispersion plating or other surface treatment can be applied to the inner peripheral surface of the annular convex part defining the outer-ring portion of the sliding bearing 18 and to the outer peripheral surface of the annular concave part defining the inner-ring portion. Application of surface treatment makes it possible to impart desired surface hardness, wear resistance/friction and/or lubricity on the inner peripheral surface and outer peripheral surface.

Third Embodiment

FIG. 3(a) is a cross-sectional view illustrating a strain wave gearing having a unit structure according to a third embodiment, and FIG. 3(b) is an enlarged partial view thereof. The third embodiment is a case in which the present invention is applied to a cup-type strain wave gearing. A cup-type strain wave gearing having a unit structure 20 (hereinafter simply refer to as a "strain wave gearing 20") is provided with a cylindrical unit housing 22 having a structure in which an annular first housing 22a and an annular second housing 22b are coaxially fixed in the direction of a device axial line 20a. An annular rigid internally toothed gear 23 is attached to the unit housing 22. A flexible externally toothed gear 26 capable of meshing with the internally toothed gear 23 is coaxially disposed inside the internally toothed gear 23. A wave generator 27 having an elliptical contour is disposed inside the externally toothed gear 26. The wave generator 27 makes the externally toothed gear 26 to flex elliptically and to mesh with the internally toothed gear 23 at two positions in the circumferential direction. The externally toothed gear 26 is coaxially attached to a discoid output member 25.

In this embodiment, the internally toothed gear 23 is a stationary-side gear (a first gear) attached to the unit housing 22. The externally toothed gear 26 is a driving-side gear (a second gear) attached to the output member 25 outputting a reduced-speed rotation. A sliding bearing 28 is disposed between the unit housing 22 which is a stationary-side part and the output member 25 which is a driving-side part, the sliding bearing supporting these members in a relatively rotatable state in the radial direction and the thrust direction.

The externally toothed gear 26 is of a cup shape and is provided with a cylindrical body 26a, a diaphragm 26b extending inward in the radial direction from one end of the cylindrical body 26a, an annular rigid boss 26c formed to be continued from the inner peripheral edge of the diaphragm 26b, and external teeth 26d formed on an outer peripheral surface portion on the side of the other end of the cylindrical body 26a. The boss 26c of the externally toothed gear 26 is coaxially attached to the inner peripheral edge portion of the output member 25 in the direction of the device axial line 20a. The cylindrical body 26a of the externally toothed gear 26 is coaxially surrounded by the unit housing 22. The internally toothed gear 23 is coaxially attached to the end face of the first housing 22a of the unit housing 22 in the direction of the device axial line 20a.

Referring mainly to FIG. 3(b), the sliding bearing 28 will be explained. The second housing 22b of the unit housing 22, which is the stationary-side part, has a circular inner peripheral surface where an annular convex part 22c having a rectangular cross-section and protruding inward in the radial direction is formed. An annular concave part having a rectangular cross-section is formed on the side of the output member 25 which is the driving-side part and is located inside the second housing 22b. The annular concave part of this embodiment is formed by a circular outer peripheral surface 25b and annular end faces 25c and 25d on the side of the output member 25. The annular convex part 22c is accommodated in the annular concave part from the outside in the radial direction via a constant radial gap and constant thrust gaps.

Specifically, the circular inner peripheral surface 22d of the annular convex part 22c faces the circular outer peripheral surface 25b of the annular concave part in the radial direction across the constant radial gap. The annular end face 22e of the annular convex part 22c faces the annular end face 25c of the annular concave part in the direction of the device axial line 20a across the constant thrust gap. Similarly, the annular end face 22f of the annular convex part 22c faces the other annular end face 25d of the annular concave part in the direction of the device axial line 20a across the constant thrust gap. A cylindrical bush 28a is accommodated in the radial gap as a sliding member comprising a radial bearing portion of the sliding bearing 28. Annular bushes 28b and 28c are accommodated in the thrust gaps, respectively, as a sliding member comprising a thrust bearing portion of the sliding bearing 28.

In this embodiment, the annular concave part on the side of the output member 25 is configured as follows. The output member 25 has an annular end face 25d on the side of the internally toothed gear 23, the annular end face being formed with a cylindrical part 25e that has a rectangular cross-section and protrudes in the direction of the device axil line 20a. A female screw is formed on the circular inner peripheral surface of the cylindrical part 25e. An annular flange 29 having an L-shaped cross-section and being formed with a male screw thereon is screwed into and fixed to the cylindrical part 25e along the direction of the device axial line 20a. The cylindrical part 25e is formed with a circular outer peripheral surface 25b of the annular concave part, and the annular flange 29 is formed with one annular end face 25c of the annular concave part.

The annular flange 29 is formed with through holes 29a passing therethrough in the direction of the device axial line 20a at prescribed intervals along the circumferential direction. The through holes 29a are used as a tool engaging hole when threading the annular flange 29, and are also used as an adhesive hole for bonding and fixing the threaded portion 29b between the annular flange 29 and the cylindrical part 25e. The thrust gap can be adjusted by increasing or decreasing the screwing amount of the annular flange 29.

The strain wave gearing 20 employs the sliding bearing 28 as a bearing for supporting the stationary-side part and the driving-side part in a relatively rotatable state. By using the sliding bearing 28, the strain wave gearing 20 can be easily reduced in size and made compact, and it is also advantageous to reduce the weight of the strain wave gearing 20 in comparison with a case in which a crossed roller bearing, a four-point contact ball bearing or other rolling bearing is used.

Here, the unit housing 22, the internally toothed gear 23 and the output member 25 can be made of a material selected from steel, light alloy, ceramic and plastic, respectively. When these components are made of a material such as a light alloy or a plastic, the device can be further reduced in weight. Further, hard plating, solid lubricant dispersion plating or other surface treatment may be applied to the inner peripheral surface of the annular convex part defining the outer ring portion of the sliding bearing 28 and the outer peripheral surface of the annular concave part defining the inner ring portion. Application of surface treatment makes it possible to impart desired surface hardness, wear resistance/friction and/or lubricity on the inner peripheral surface and outer peripheral surface.

The invention claimed is:

1. A strain wave gearing, the strain wave gearing comprising:
   a rigid internally toothed gear;
   a flexible externally toothed gear capable of meshing with the internally toothed gear;
   a wave generator for making the externally toothed gear to flex into a non-circular shape and to partially mesh with the internally toothed gear;
   a cylindrical unit housing to which one of the internally toothed gear and the externally toothed gear being a first gear is mounted;
   an output member to which a second gear is mounted, the second gear being the other of the internally toothed gear and the externally toothed gear; and
   a first part including the unit housing and the first gear, a second part including the second gear and the output member, a sliding bearing for supporting the first part and the second part in a radial direction and in a thrust direction so that the first and second parts can relatively rotate;
   wherein:
   the unit housing and the first gear are a stationary-side part, and the second gear and the output member are a driving-side part;
   one of the stationary-side part and the driving-side part has an annular convex part having a rectangular cross-section and protruding in a radial direction;
   the other of the stationary-side part and the driving-side part has an annular concave part having a rectangular cross-section, the annular convex part being accommodated in the annular concave part from outside or inside in the radial direction;
   the annular convex part and the annular concave part face with each other across a predetermined radial gap in the radial direction, and the annular convex part and the annular concave part face with each other across a predetermined thrust gap in a direction of a device axial line on both sides of the annular convex part in the direction of the axial line; and
   the sliding bearing has: an outer-ring portion defined by one of the annular convex part and the annular concave part; an inner-ring portion defined by the other of the annular convex part and the annular concave part; a cylindrical bush accommodated in the radial gap; and annular bushes accommodated in the thrust gaps, respectively.

2. The strain wave gearing according to claim 1, wherein the unit housing, the internally toothed gear and the output member are a component part made of a material selected from steel, light alloy, ceramic and plastic.

3. The strain wave gearing according to claim 2, wherein surface portions defining the outer-ring portion and the inner-ring portion of the annular convex part and the annular concave part are plating treatment surfaces having a prescribed surface hardness, wear resistance/friction or lubricity.

4. The strain wave gearing according to claim 1, further comprising:
   an annular driving-side internally toothed gear that is coaxially disposed with respect to the internally toothed gear in parallel;
   wherein the internally toothed gear is the first gear coaxially attached to a circular inner peripheral surface of the unit housing, and the externally toothed gear is the second gear;
   the driving-side internally toothed gear is coaxially attached to an annular flange formed on the output member;
   the externally toothed gear is coaxially disposed inside the internally toothed gear and the driving-side internally toothed gear, the externally toothed gear being flexed by the wave generator into a non-circular shape to mesh with the internally toothed gear and the driving-side internally toothed gear, respectively;
   a number of teeth of the internally toothed gear is different from that of the externally toothed gear so that relative rotation is generated between the internally toothed gear and the externally toothed gear in accordance with rotation of the wave generator;
   the externally toothed gear has the same number of teeth as that of the driving-side internally toothed gear so as to integrally rotate with the driving-side internally toothed gear in accordance with rotation of the wave generator;
   the unit housing and the internally toothed gear forms an annular concave part that has a rectangular cross-section and opens inward in the radial direction;
   the annular flange of the output member and the driving-side internally toothed gear forms an annular convex part protruding outward in the radial direction;
   the annular convex part and the annular concave part face with each other across a predetermined radial gap in the radial direction, and the annular convex part and the annular concave part face with each other across a predetermined thrust gap in a direction of the device axial line on both sides of the annular convex part in the direction of the device axial line, respectively; and
   in the sliding bearing the outer-ring portion is defined by the annular concave part; and the inner-ring portion is defined by the annular convex part.

5. The strain wave gearing according to claim 4, wherein the unit housing, the internally toothed gear, the driving-side internally toothed gear and the output member are component parts made of a material selected from steel, light alloy, ceramic and plastic, respectively.

6. The strain wave gearing according to claim 5, wherein surface portions defining the outer-ring portion and the inner-ring portion of the annular convex part and the annular concave part are a plating treatment surface having predetermined surface hardness, wear resistance/friction or lubricity.

7. The strain wave gearing according to claim 1, wherein
the first gear is the externally toothed gear and which has a top-hat shape and a cylindrical body, a diaphragm extending outward in the radial direction from one end of the cylindrical body, an annular rigid boss formed to be continued from an outer peripheral edge of the diaphragm, and external teeth formed on an outer peripheral surface portion of the other end of the cylindrical body;
the unit housing is disposed adjacent to the boss of the externally toothed gear in a direction of a device axis line and coaxially surrounding the cylindrical body of the externally toothed gear;
the boss is coaxially attached to the unit housing;
the second gear is the internally toothed gear and which has an annular shape and is coaxially disposed between the unit housing and the cylindrical body of the externally toothed gear;
the unit housing has an inner peripheral surface where an annular convex part having a rectangular cross-section and protruding inward in the radial direction is formed;
the internally toothed gear has: a circular outer peripheral surface facing a circular inner peripheral surface of the annular convex part across a predetermined radial gap; and an annular concave part having a rectangular cross-section, the annular concave part having annular end faces that face annular end faces of the annular convex part on both sides in the direction of the device axis line across predetermined thrust gaps, respectively; and
in the sliding bearing the outer-ring portion is defined by the annular convex part; and the inner-ring part is defined by the annular concave part.

8. The strain wave gearing according to claim 7, wherein
the unit housing has a first housing and a second housing;
the first housing is disposed to surround the internally toothed gear, and the second housing is disposed between the first housing and the boss of the externally toothed gear;
the second housing has the annular convex part; and
the unit housing, the internally toothed gear and the output member are component parts made of a material selected from steel, light alloy, ceramic and plastic.

9. The strain wave gearing according to claim 8, wherein
a surface portion defining the outer-ring portion of the annular convex part and a surface portion defining the inner-ring portion of the concave part are a plating treatment surface having predetermined surface hardness, wear resistance/friction or lubricity, respectively.

10. The strain wave gearing according to claim 7, wherein
the internally toothed gear has a cylindrical part having a rectangular cross-section and protruding toward the diaphragm of the externally toothed gear in a direction of the device axis line;
an annular flange having an L-shaped cross-section is screwed into and fixed to the cylindrical part in the direction of the device axis line; and
the annular concave part is formed between the internally toothed gear and the annular flange fixed to the cylindrical part.

11. The strain wave gearing according to claim 7, wherein
the internally toothed gear is integrally formed with the output member.

12. The strain wave gearing according to claim 1, wherein
the first gear is the internally toothed gear which is coaxially attached to the unit housing;
the second gear is the externally toothed gear and which has a cup shape and a cylindrical body, a diaphragm extending inward in the radial direction from one end of the cylindrical body, an annular rigid boss formed to be continued from an inner peripheral edge of the diaphragm, and external teeth formed on an outer peripheral surface portion of the other end of the cylindrical body;
the output member disposed inside the unit housing is coaxially attached to the boss of the externally toothed gear;
the unit housing has an inner peripheral surface where an annular convex part having a rectangular cross-section and protruding inward in the radial direction is formed;
the output member has: a circular outer peripheral surface facing a circular inner peripheral surface of the annular convex part across a predetermined radial gap; and an annular concave part having a rectangular cross-section, the annular concave part having annular end faces that face annular end faces of the annular convex part on both sides in the direction of the device axis line across predetermined thrust gaps, respectively; and
in the sliding bearing the outer-ring portion is defined by the annular convex part; and the inner-ring part is defined by the annular concave part.

13. The strain wave gearing according to claim 12, wherein
the unit housing has a first housing and a second housing;
the first housing is disposed to surround the output member, and the second housing is disposed between the first housing and the internally toothed gear;
the second housing has the annular convex part; and
the unit housing, the internally toothed gear and the output member are component parts made of a material selected from steel, light alloy, ceramic and plastic, respectively.

14. The strain wave gearing according to claim 13, wherein
a surface portion defining the outer-ring portion of the annular convex part and a surface portion defining the inner-ring portion of the concave part are a plating treatment surface having predetermined surface hardness, wear resistance/friction or lubricity, respectively.

15. The strain wave gearing according to claim 12, wherein
the output member has a cylindrical part having a rectangular cross-section and protruding toward the internally toothed gear in a direction of the device axis line;
an annular flange having an L-shaped cross-section is screwed into and fixed to the cylindrical part in the direction of the device axis line; and
the annular concave part is formed between the output member and the annular flange.

* * * * *